(12) United States Patent
Sercel et al.

(10) Patent No.: US 8,837,549 B2
(45) Date of Patent: Sep. 16, 2014

(54) CONTINUOUS MASS FLOW GAS REPLENISHMENT FOR GAS LASING DEVICES

(71) Applicant: IPG Microsystems LLC, Manchester, NH (US)

(72) Inventors: Jeffrey P. Sercel, Hollis, NH (US); Dana K. Sercel, Bedford, NH (US); Michael Von Dadelszen, Merrimack, NH (US); Daniel B. Masse, Windham, NH (US); Bruce R. Jenket, Center Harbor, NH (US)

(73) Assignee: IPG Microsystems LLC, Manchester, NH (US)

( * ) Notice: Subject to any disclaimer, the term of this patent is extended or adjusted under 35 U.S.C. 154(b) by 12 days.

(21) Appl. No.: 13/684,397

(22) Filed: Nov. 23, 2012

(65) Prior Publication Data

US 2013/0182737 A1    Jul. 18, 2013

Related U.S. Application Data

(60) Provisional application No. 61/563,239, filed on Nov. 23, 2011.

(51) Int. Cl.
*H01S 3/22* (2006.01)
*H01S 3/036* (2006.01)

(52) U.S. Cl.
CPC ....................... *H01S 3/036* (2013.01)
USPC .................. 372/58; 372/57; 372/55

(58) Field of Classification Search
USPC ................................ 372/58, 57, 55
See application file for complete search history.

(56) References Cited

U.S. PATENT DOCUMENTS

| 3,566,304 A | 2/1971 | Hunley et al. |
| 3,586,994 A | 6/1971 | Rosenberger |
| 3,876,957 A | 4/1975 | Thatcher |
| 4,325,033 A | 4/1982 | Shutt |
| 4,651,325 A | 3/1987 | Wang et al. |
| 4,674,099 A | 6/1987 | Turner |

(Continued)

FOREIGN PATENT DOCUMENTS

JP          8210885 A    8/1996

OTHER PUBLICATIONS

International Search Report and Written Opinion dated Mar. 25, 2013, received in corresponding PCT Application No. PCT/US12/66455, 13 pgs.

*Primary Examiner* — Kinam Park
(74) *Attorney, Agent, or Firm* — Grossman Tucker Perreault & Pfleger, PLLC

(57) ABSTRACT

Continuous mass flow gas replenishment may be implemented in a gas lasing device, such as a gas laser or amplifier, by using a restrictive orifice to bleed one or more gases into a reservoir and/or discharge chamber of the gas laser or amplifier at a predefined mass flow rate. The mass flow rate is a function of the pressure drop across the restrictive orifice resulting from the pressure differential between the depleted gas and the source gas. Thus, gases may be added as needed such that the gas total pressure, as well as the constituent partial pressures, is maintained within a desired range throughout the laser or amplifier fill lifetime. The continuous mass flow gas replenishment may thus make up the lost partial pressure of reactive gases in gas lasing devices in a manner that is less complicated and is less expensive than other continuous flow methodologies.

20 Claims, 9 Drawing Sheets

(56) References Cited

U.S. PATENT DOCUMENTS

| | | | |
|---|---|---|---|
| 4,803,693 | A | 2/1989 | Schramm |
| 4,861,302 | A | 8/1989 | Antal et al. |
| 4,977,573 | A | 12/1990 | Bittenson et al. |
| 5,005,181 | A | 4/1991 | Yoshioka et al. |
| 5,099,491 | A | 3/1992 | Chaffee |
| 5,301,203 | A | 4/1994 | Schlie et al. |
| 5,309,747 | A | 5/1994 | Yasui |
| 5,317,126 | A | 5/1994 | Couch et al. |
| 5,396,514 | A | 3/1995 | Voss |
| 5,450,436 | A | 9/1995 | Mizoguchi et al. |
| 5,802,093 | A * | 9/1998 | Townsend et al. ............ 372/55 |
| 5,978,406 | A | 11/1999 | Rokni et al. |
| 6,151,349 | A | 11/2000 | Gong et al. |
| 6,154,470 | A | 11/2000 | Basting et al. |
| 6,381,256 | B1 | 4/2002 | Stamm et al. |
| 6,389,052 | B2 | 5/2002 | Albrecht et al. |
| 6,466,599 | B1 | 10/2002 | Bragin et al. |
| 6,490,307 | B1 | 12/2002 | de Mos et al. |
| 6,490,308 | B2 | 12/2002 | Albrecht et al. |
| 6,504,861 | B2 | 1/2003 | Albrecht et al. |
| 6,546,037 | B2 | 4/2003 | Stamm et al. |
| 6,678,291 | B2 | 1/2004 | Vogler et al. |
| 6,963,595 | B2 | 11/2005 | Rule et al. |
| 6,965,624 | B2 | 11/2005 | Albrecht et al. |
| 7,266,137 | B2 | 9/2007 | Albrecht et al. |
| 7,372,887 | B2 | 5/2008 | Matsunaga et al. |
| 7,741,639 | B2 | 6/2010 | Besaucele et al. |
| 7,835,414 | B2 | 11/2010 | Dunstan et al. |
| 2001/0032947 | A1 | 10/2001 | Freisinger et al. |
| 2006/0056478 | A1 * | 3/2006 | Albrecht et al. ................ 372/55 |
| 2009/0129423 | A1 * | 5/2009 | Wilson ........................... 372/58 |

* cited by examiner

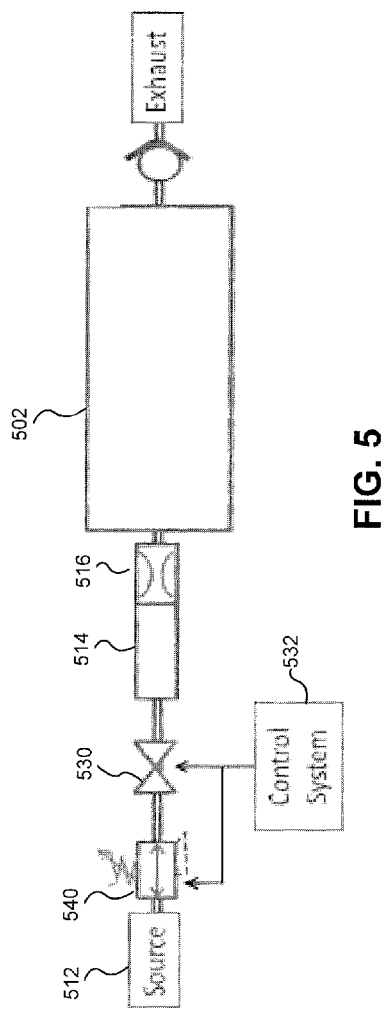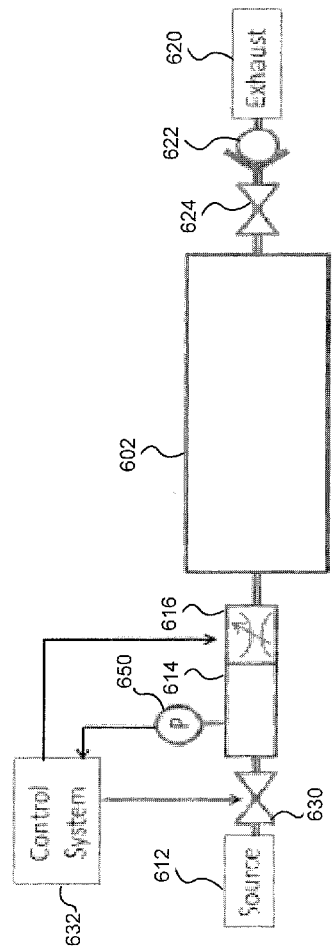

CONTINUOUS MASS FLOW GAS REPLENISHMENT FOR GAS LASING DEVICES

CROSS-REFERENCE TO RELATED APPLICATIONS

The present application claims the benefit of U.S. Provisional Patent Application Ser. No. 61/563,239 filed on Nov. 23, 2011, which is fully incorporated by reference.

TECHNICAL FIELD

The present disclosure relates to the field of gas lasers and amplifiers, and more particularly, to the replenishment of the gaseous gain medium of exciplex gas lasers and amplifiers in order to maintain or enhance the total pressure or partial pressures of the operating gases to extend the usable lifetime of the gases.

BACKGROUND INFORMATION

Gas lasing devices, such as excimer or exciplex lasers and amplifiers, use a gas or a gas mixture as a gain medium to amplify light and/or provide laser output. Such gas lasing devices may include a sealed pressure chamber that includes two main discharge electrodes, a gas circulation system, gas reservoir, at least one feed valve, and two windows or resonator optics. The reservoir and main discharge chamber contain one or more high purity, ionizable gases, which often must be periodically evacuated to a minimum pressure and refilled under typical operating conditions.

In a gas lasing device, the gases should each be at the correct partial pressure such that laser efficiency is maximized and output beam quality is consistent. For many gas laser types, the gas partial pressures are depleted during laser usage. In exciplex lasers using a highly reactive halogen gas, for example, the halogen gas is continuously depleted from the discharge chamber by binding with components (e.g., water or contaminants) within the discharge chamber or reservoir. Depletion of the gaseous gain medium presents a problem with performance, particularly in those lasing devices that utilize highly reactive halogen gases. During the course of a single laser gas fill lifetime, the output energy of the laser will decrease as a function of shot count and time due to, at least in part, the depletion of the reactive gas. Although the gases may be removed and refilled, the cost of refilling and/or the downtime required may significantly increase the cost of owning and operating gas lasing devices used in many industrial manufacturing applications. To prolong the life of a gas fill (or fill lifetime) in a gas laser or amplifier, the gases may be replenished as gases are depleted without having to empty and refill.

A gas laser may have a control system that monitors the output pulse energy of the laser and controls the high voltage supplied to the discharge electrodes such that the output remains constant. Alteration of the relative concentration of any one of the laser gases or a change in the total gas pressure with respect to the optimum will cause a reduction in output energy requiring an increase in high voltage to maintain laser pulse energy. An increase in the voltage may accelerate depletion of the gases, due to the generation of dust contaminants resulting from increased wear on the electrodes and a greater input of energy, most of which is dissipated as heat. Higher input voltage also modifies the optical properties of the laser beam, which may cause the end user to have less usable energy on target.

One method to extend the lifetime of the gaseous laser gain medium is to periodically add one or more of the laser gases throughout the laser gas fill lifetime at a predetermined upper limit increase in input voltage or some other parameter indicative of the depletion of one or more of the gases. Such discrete gas injection may extend the life of the laser but relies on monitoring a parameter that may have already degraded for other reasons. Such discrete gas injection techniques may also result in dilution of other constituent gases when only the most reactive component of a mixture of gases is depleted and replenished. Another drawback to existing discrete gas injection methods is the tendency of the laser discharge chamber gases to back-mix through the gas input system as pressures equilibrate. Back mixing of laser discharge gases will cause contamination of the gas source lines and will change the ratios of the gas mixtures in the gas input system, thereby reducing laser gas lifetime.

A further drawback of the discrete gas injection methods is the inherent variability of the laser operating conditions as a result of the sudden introduction of the gases. For example, input voltage increases gradually as output energy decreases due to depletion and contamination. The sudden introduction of additional gases causes the output energy to increase (and voltage to decrease) relatively abruptly, with a correlating change in beam character, all of which can have an influence on process repeatability and reliability.

Another method of replenishing amounts of laser gases includes constant, low levels of flushing of one or more laser gases throughout the laser run. Such methods of continuous gas replenishment have the potential to provide more stable performance of the laser. These methods have been employed in applications either with an algorithm used to calibrate response to a variety of parameters or with a filtration system designed to remove impurities and/or one or more constituent gases prior to replenishing the gases in higher concentrations. Existing continuous gas replenishment methods, however, have required complex and expensive components to provide the improved stability. These complex components are also more likely to fail and require costly service by specialized factory technicians. Thus, the high cost and service demands often negate any advantage over the discrete injection methods.

Continuous gas replenishment is preferable to discrete gas injection because the laser is not subject to repeated cycles of gas depletion and recovery that can change beam parameters and shorten the gas lifetime. Another technique uses discrete injection amounts with the goal of decreasing the volume and interval such that the response to the injections nears that of a continuous injection but without using overly complicated and expensive continuous gas replenishment systems. This controlled discrete injection method, however, may result in back-mixing of the laser gas, contamination of the source gas lines, and a continuously changing effective rate of injection of reactive gas. This controlled discrete injection method may also lead to millions of cycles of wear on the injector valves, further increasing the possibility for component failure and system down time. As such, methods for monitoring changes in chamber operation as a means to control discrete gas injections have become increasingly complex and have produced no significant benefits to operational stability and cost reduction.

Thus, existing gas replenishment techniques rely on expensive equipment or operator judgment, may not be reliable or repeatable in an industrial environment, and can be prone to back-flow contamination of the gas supply manifold system.

BRIEF DESCRIPTION OF THE DRAWINGS

These and other features and advantages will be better understood by reading the following detailed description, taken together with the drawings wherein:

FIG. 5 is a schematic view of a continuous mass flow gas replenishment system with an adjustable pressure regulator, a control valve and a fixed orifice, consistent with yet another embodiment of the present disclosure.

FIG. 6 is a schematic view of a continuous mass flow gas replenishment system with a variable flow restriction, isolated exhaust valve, and pressure indicator, consistent with yet a further embodiment of the present disclosure.

DETAILED DESCRIPTION

Continuous mass flow gas replenishment, consistent with embodiments of the present disclosure, may be implemented in a gas lasing device, such as a gas laser or amplifier, by using a restrictive orifice to bleed one or more gases into a reservoir and/or discharge chamber of the gas laser or amplifier at a predefined mass flow rate. The mass flow rate is a function of the pressure drop across the restrictive orifice resulting from the pressure differential between the depleted gas in the laser or amplifier and the source gas. Thus, one or more gases may be added as needed such that the gas total pressure, as well as the constituent partial pressures, is maintained within a desired range throughout the laser or amplifier fill lifetime. A continuous mass flow gas replenishment system and method may thus make up the lost partial pressure of reactive gases in gas lasers or amplifiers in a manner that is less complicated and is less expensive than other continuous flow methodologies.

The continuous mass flow gas replenishment system may include an exhaust line with a check valve that stabilizes the reservoir and/or discharge chamber total pressure. The continuous mass flow gas replenishment system may also include a control valve and/or pressure regulator in line with the restrictive orifice to adjust the rate of flow. The continuous mass flow gas replenishment system may also include a bleed-down bypass flow through a fixed orifice to an exhaust system. The continuous mass flow gas replenishment system may further include a control system or circuit, which adjusts the mass flow rate in response to changes in one or more measured system performance parameters. The continuous mass flow system may thus advantageously use simple laser input or output parameters to control the efficient replenishment of chamber gases.

As used herein, "continuous mass flow gas replenishment" refers to the replenishment of depleted gas with fresh gas capable of flowing without interruption at a predefined mass flow rate in response to pressure changes as gas is depleted during operation of the lasing device. The mass flow rate may vary as a function of pressure across the restrictive orifice and the flow may be interrupted if necessary, for example, during equipment maintenance. Although not necessarily a limitation of the present disclosure, the restrictive orifice may be located in a metering device that operates on the principle of Bernoulli's Equation, which directly relates the mass flow rate of a fluid (e.g., the gas) to the pressure differential across the restrictive orifice. The metering device may include, without limitation, an orifice plate, Venturi tube, flow valve or nozzle, or other similar device to produce a pressure drop across the device and a proportional mass flow rate through the device. The metering device may include a fixed or variable orifice to moderate the pressure drop and mass flow rate.

Figure 1A:
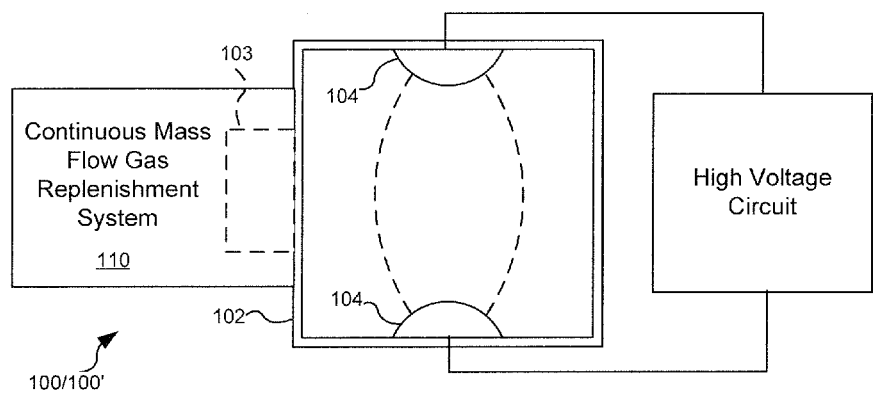
FIGS. 1A-1C are schematic views of gas lasing devices using a continuous mass flow gas replenishment system, consistent with embodiments of the present disclosure.
Figure 1B:
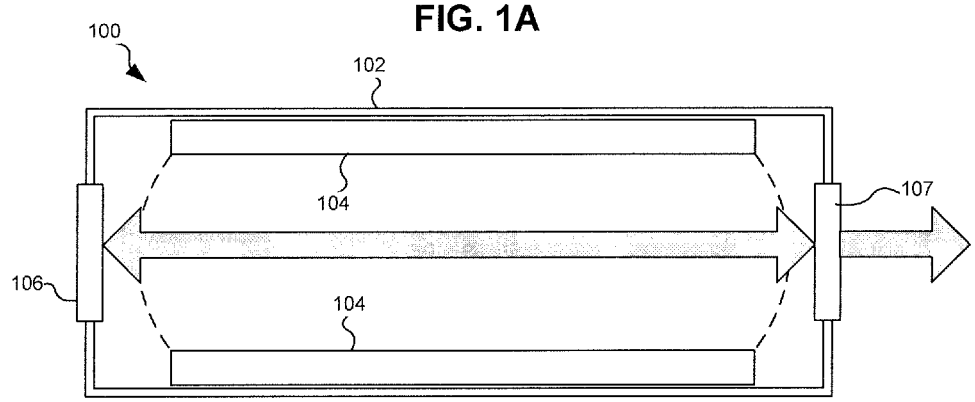
Figure 1C:
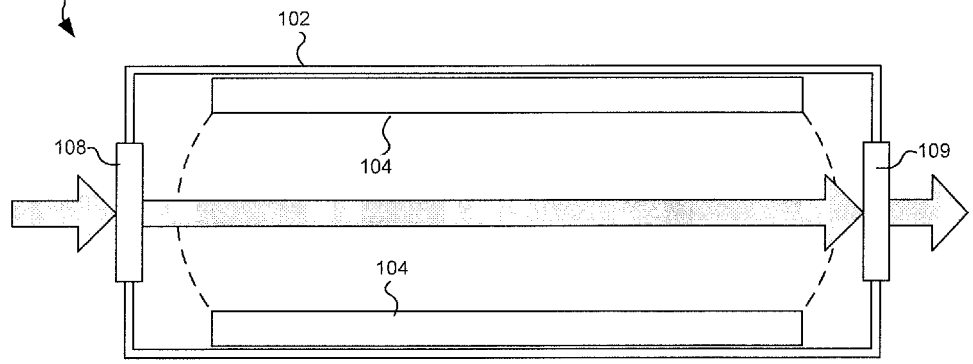

Referring to FIGS. 1A-1C, a continuous mass flow gas replenishment system 110, consistent with embodiments of the present disclosure, may be used with a gas lasing device, such as a gas laser 100 or a gas optical amplifier 100', including a sealed discharge chamber 102 containing a mixture of gases and a plurality of electrodes 104 forming a gas discharge region. The gas laser 100 or gas amplifier 100' may also include an optional gas reservoir 103 for holding gas before being entering the gas discharge chamber 102. The term "gas discharge chamber" is used herein to refer to the gas discharge chamber 102 alone or with the optional gas reservoir 103. The gas laser 100 (FIG. 1B) forms a resonator cavity, for example, between resonator optics such as a mirror or reflector 106 and a partial reflector 107. The gas amplifier 100' (FIG. 1C) allows light to pass through for amplification, for example, through front and rear windows or transparent regions 108, 109.

The gas breakdown occurs transversely in the discharge region between the electrodes 104 (e.g., perpendicular to the windows/mirrors) when enough energy is inputted and the discharge medium is at an optimal state. The discharge is the means by which the gas medium is pumped into the lasing upper state for net gain generation. In gas lasers, the main discharge is typically of sufficient duration for the intracavity photons to increase in intensity while circulating through the length of the cavity multiple times and to be emitted out of the front of the cavity. Exciplex gas lasers may use rare and halide gas mixtures or halogen gas only, in conjunction with a buffer gas, to emit light in the ultra-violet region. In the optical amplifier, the incoming photons are amplified while transiting through the excited medium, either in a single pass or in multiple passes.

Figure 2A:
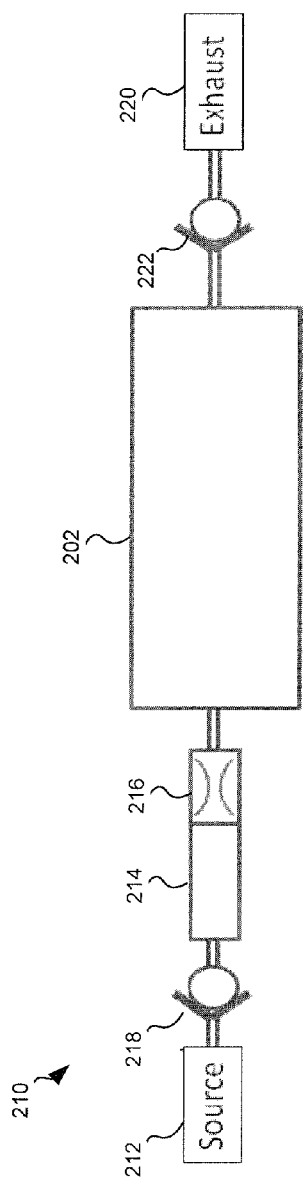
FIGS. 2A and 2B are schematic view of a continuous mass flow gas replenishment system with a fixed orifice for metering gas from one or more gas sources, consistent with an embodiment of the present disclosure.

As shown in FIG. 2A, a continuous mass flow gas replenishment system 210 may be coupled to a gas reservoir and/or gas discharge chamber 202 (hereinafter "gas discharge chamber") of a gas laser or amplifier for providing gas replenishment from a gas source 212. This embodiment of the continuous mass flow gas replenishment system 210 includes an accumulator gas chamber 214 coupled to a restrictive orifice 216. The restrictive orifice 216 allows for gas to flow between the accumulator gas chamber 214 and the gas discharge chamber 202 at a predefined mass flow rate as a function of the pressure differential between the accumulator chamber 214 and the gas discharge chamber 202. The accumulator chamber 214 is coupled to the gas source 212 via a check valve 218 to allow gas to flow into the accumulator chamber 214 without allowing gas to flow back to the source 212 such that gas in the gas chamber 202 may not be freely exchanged with the source gas. The restrictive orifice 216 may be fixed or mechanically variable depending on the intended usage of the laser or amplifier and may have an optimized dimension and mass flow rate based on the performance of the laser or amplifier.

The dimension of the restrictive orifice 216 and the pressure ratios across the restrictive orifice 216 may also be chosen such that there is substantially no back mixing of gases through the orifice 216, while maintaining the desired mass flow rate into the gas discharge chamber 202. This embodiment of the continuous mass flow gas replenishment system 210 also includes an exhaust system 220 coupled to the discharge chamber 202 via a check valve 222. The check valve 222 may be set at such a pressure that gas at some predetermined pressure value above the standard operating pressure may flow out of the gas discharge chamber 202 and through the exhaust system 220 and/or through a gas cleaning and recycling circuit. The check valve 222 may be positioned at a distance from the source gas inlet location such that the relieved pressure is fully mixed gas and thus allows for more a consistent gas mixture, as well as more consistent performance due to the maintenance of an optimized total pressure throughout the gas fill lifetime.

Figure 2B:
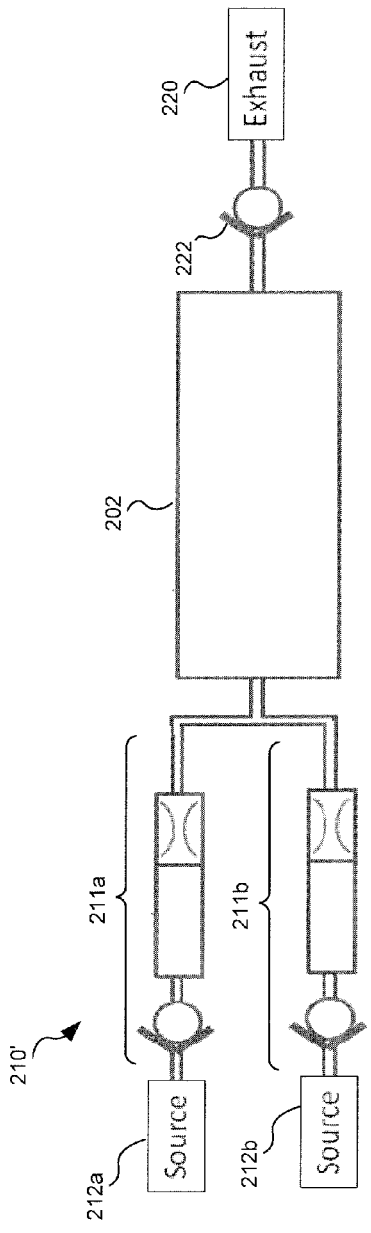

The configuration shown in FIG. 2A may be extended to multiple source gases, as shown in the continuous mass flow gas replenishment system 210' of FIG. 2B. FIG. 2B illustrates two gas sources 212a, 212b for providing two different gases on two separate continuous mass flow lines 211a, 211b. Additional gas sources and continuous mass flow lines may also be used within the scope of the present disclosure. This embodiment of the continuous mass flow gas replenishment system 210' may be configured to introduce each of the gases singly or in combination. For example, the system 210' may include the ability to replenish a mixed buffer/halogen gas mixture along with a buffer/rare gas mixture or may be configured to replenish halogen-only along with a buffer/rare gas mixture.

These embodiments of the continuous mass flow gas replenishment system 210, 210' simplify and reduce the number of components (e.g., as compared to other controlled continuous gas replenishment systems) without sacrificing reliability. These embodiments may also be enhanced by a high thermal stability of the gas within the laser reservoir and/or discharge chamber. Gas lasers can be inefficient, dissipating much of the input energy as heat within the laser reservoir and/or discharge chambers, and are therefore known to cycle in temperature based upon duty cycle and consequent change in discharge chamber gas composition. Continuous mass flow gas replenishment systems, as described herein, may operate more successfully because the pressure does not increase and then drop at unpredictable rates throughout the fill lifetime. The continuous mass flow gas replenishment system and method, consistent with embodiments of the present disclosure, may thus provide appropriate thermal stabilization since the amount of source gas that enters the laser reservoir and/or discharge chamber during cool-down can be predicted and accommodated.

FIGS. 3-6 illustrate additional embodiments of a continuous mass flow gas replenishment system that uses a restrictive orifice to control mass flow of gas into a gas reservoir and/or gas discharge chamber of a gas laser or optical amplifier. Although the embodiments of the systems shown in FIGS. 3-6 include a single gas source and continuous mass flow line, each of these embodiments may also include multiple continuous mass flow lines for providing gases from multiple sources, similar to the embodiment shown in FIG. 2B.

Figure 3:
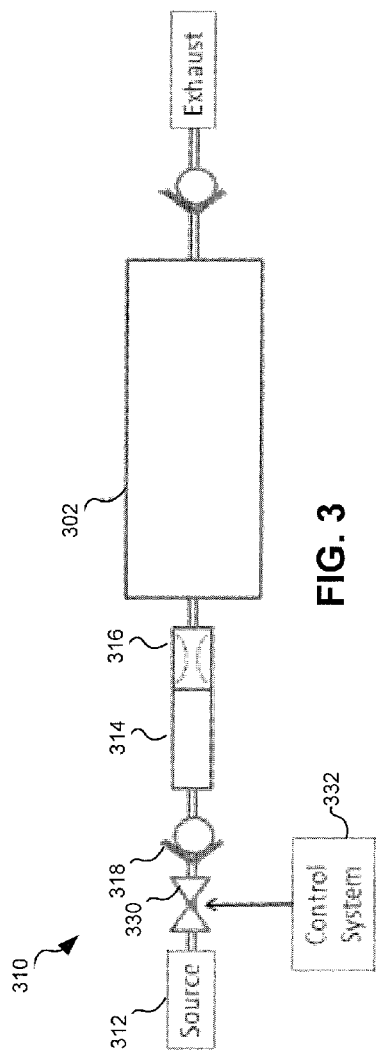
FIG. 3 is a schematic view of a continuous mass flow gas replenishment system with a control valve and a fixed orifice, consistent with a further embodiment of the present disclosure

FIG. 3 depicts another embodiment of a continuous mass flow gas replenishment system 310 that would further minimize or eliminate sensitivity to thermal stability. The continuous mass flow gas replenishment system 310 includes an accumulator gas chamber 314 coupled to a gas source 312 via a check valve 318 and a restrictive orifice 316 for allowing the gas to flow into a gas discharge chamber 302, similar to the systems 110, 110' described above. This embodiment of the continuous mass flow gas replenishment system 310 further includes a control valve 330 actuated by a control system 332 to provide further control over the gas allowed to pass into the accumulator gas chamber 314. The control system 332 may include any combination of hardware and software used to control valves in a fluid supply system.

The control system 332 may control the opening of the control valve 330 at intervals that are either predetermined or are based on feedback from one or more laser or amplifier parameters such that the effective mass flow rate can be finely adjusted. The control valve 330 can also be closed so that the source gas does not enter the gas discharge chamber 302 through the accumulator chamber 314 and fixed restriction orifice 316, for example, during periods of discharge chamber cooling. The control valve 330 may also prevent the back flow of gas to the gas source 312 and thus the check valve 318 may not be required in the continuous mass flow gas replenishment system 310.

Figure 4:
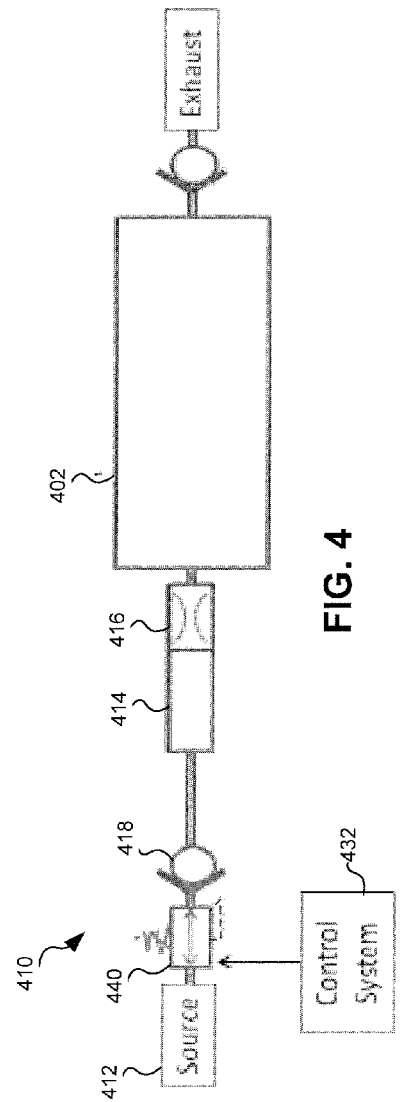
FIG. 4 is a schematic view of a continuous mass flow gas replenishment system with an adjustable pressure regulator and a fixed orifice, consistent with a further embodiment of the present disclosure.

FIG. 4 depicts a further embodiment of a continuous mass flow gas replenishment system 410 that regulates the pressure of the source gas. The continuous mass flow gas replenishment system 410 includes an accumulator gas chamber 414 coupled to a gas source 412 via a check valve 418 and a restrictive orifice 416 for allowing the gas to flow into a gas discharge chamber 402, similar to the systems 110, 110' described above. This embodiment of the continuous mass flow gas replenishment system 410 further includes a controlled pressure regulator 440 in series with the check valve 418, accumulator 414 and restrictive orifice 416. The pressure regulator 440 may be used, under the control of a control system 432, to adjust the pressure drop across the restrictive orifice 416 by modulating the input pressure in response to changes in one or more system operation parameters or in response to operator input to continuously optimize the mass flow rate.

FIG. 5 depicts an embodiment of a continuous mass flow gas replenishment system 510 including both a control valve 530 and a pressure regulator 540. The continuous mass flow gas replenishment system 510 may thus continuously adjust the mass flow through a restrictive orifice 516 by regulating the pressure of gas from a gas source 512 via the pressured regulator 540. The continuous mass flow gas replenishment system 510 may also interrupt the flow to an accumulator gas chamber 514 via the control valve 530, such as during times of large temperature variation or during equipment maintenance. A control system 532 may be used to control both the pressure regulator and the control valve 530. This embodiment of the continuous mass flow gas replenishment system 510 also does not include a check valve and the control valve 530 may be used to prevent back flow of gas to the gas source 512.

FIG. 6 illustrates yet a another embodiment of a continuous mass flow gas replenishment system 610 that provides further control over the flow of gas into a gas discharge chamber 602. This embodiment of the continuous mass flow gas replenishment system 610 includes an accumulator gas chamber 614 with a pressure gauge 650 for monitoring pressure of the source gas or gases fed into the accumulator gas chamber 614. The accumulator pressure is monitored by a control system 632 such that if the accumulator pressure drops above or below an optimized range, an opening frequency of a control valve 630 may be adjusted to compensate. This embodiment of the continuous mass flow gas replenishment system 610 also includes a mechanically variable orifice 616 that provides for a controlled or metered mass flow of the gas from the accumulator chamber 614 into the gas discharge chamber 602. If the source pressure is not regulated within a desired range and the pressure in the accumulator chamber 614 has fluctuated such that the pressure is above or below an optimized value, adjustments can be made, via the control system 632, to the geometry of the variable orifice 616 such that gas flow into the discharge chamber 602 is held constant within a short timescale. Thus, this embodiment of the continuous mass flow gas replenishment system 610 provides additional resilience to pressure changes.

The continuous mass flow gas replenishment system 610 may also adjust the rate of gas flow into the discharge chamber 602 for different applications and duty cycles. The control system 632 may be used to automatically vary the mass flow rate by varying the variable orifice 618 or by adjusting the control valve 630 to vary the input pressure to the accumulator gas chamber 314. If the laser is to be run at a lower duty cycle, for example, less gas may be required per unit of time. The control system 632 may thus be programmed when the laser cycle is set such that the control system 632 recognizes the lower duty cycle and automatically restricts the gas flow such that the correct amount of gas flow is maintained.

The continuous mass flow gas replenishment system 610 may also be used to replenish varying amounts of multiple source gases. If more than a single gas is required to maintain consistent performance during a laser run, for example, a pre-mixture of the required concentrations may be performed within the accumulator chamber 614 using the pressure gauge 650 as a reference. A control valve 624 may also be used on the exhaust side to provide additional control of the exhaust gas through a check valve 622 to an exhaust system 620.

Figure 7A:
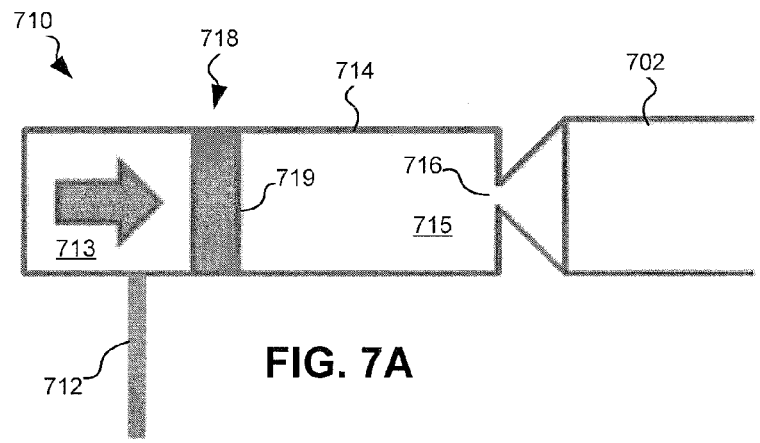
FIGS. 7A-7C are schematic views of a continuous mass flow gas replenishment system using a mechanical injection valve assembly for providing gas flow through a restrictive orifice, consistent with embodiments of the present disclosure.
Figure 7B:
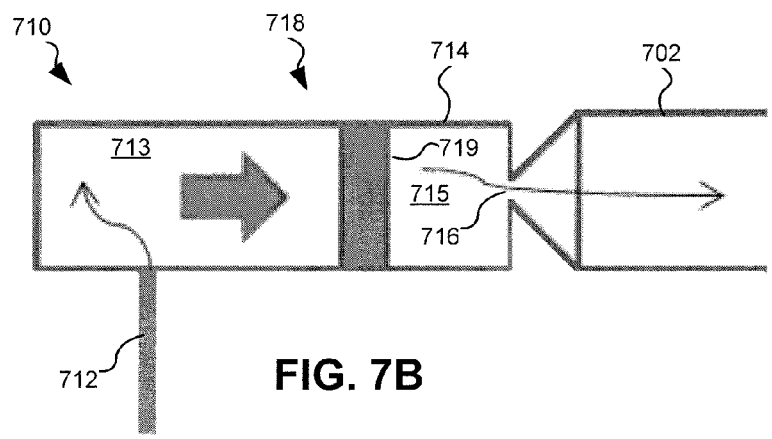
Figure 7C:
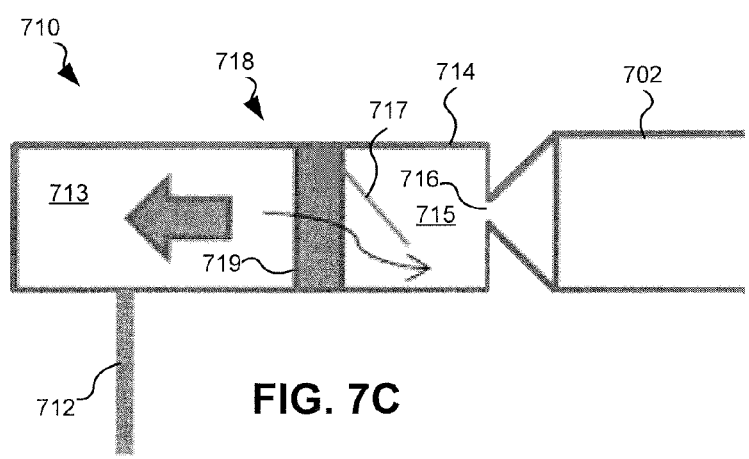

Another embodiment of a continuous mass flow gas replenishment system 710, FIGS. 7A-7C, includes an accumulator gas chamber 714 pressurized via an injection valve assembly 718 to provide gas flow through a restrictive orifice 716. The injection valve assembly 718 is capable of providing near continuous injections of fresh gas with fewer components and complexity. The injection valve assembly 718 includes a plunger 719 that moves within the accumulator chamber 714. The plunger 719 forms a seal with the accumulator chamber and includes a one-way mechanical valve 717 that allows gas to flow from a source side 713 to a discharge chamber side 715 of the plunger 719. The plunger 719 may be moved by a mechanical actuator (not shown), and the plunger 719 and mechanical actuator may be made of components and materials that are compatible with the gases being injected. A gas inlet 712 is located on the source side 713 of the plunger 717 and provides gas from a gas source (not shown).

Under static operation, the gas passively diffuses from the accumulator gas chamber 714 into the gas discharge chamber 702, as shown in FIG. 7A, at a rate that is dependent upon the source inlet pressure, which can be equal to or greater than the discharge chamber pressure, and also dependent upon the geometry of the restrictive orifice 716. The static state may be maintained for a duration, after which the accumulator pressure can be increased on the discharge chamber side 715 as the plunger 719 is compressed within the accumulator chamber 714 towards the discharge chamber 702. The continuous flow can be modulated in this manner in response to a change in discharge chamber operating conditions, thereby introducing additional gas into the discharge chamber without an abrupt change in operating conditions.

The pressure on the discharge chamber side 715 may be maintained, as shown in FIG. 7B, for a duration such that a known volume of gas may flow into the discharge chamber 702. While the discharge chamber side 715 is pressurized in this manner, a low pressure region is generated on the source side 713 behind the plunger 719. This lower pressure draws in fresh gas through the gas inlet 712 and from the gas source (not shown), which is now at a higher pressure than the source side 713 of the accumulator chamber 714.

After a duration, the plunger 719 may be reset, as shown in FIG. 7C, by retraction. The one-way mechanical valve 717 on the plunger 719 allows the pressure of new gas, which was added into the source side 713 of the accumulator chamber 714 as shown in FIG. 7B, to flow to the discharge chamber side 715 and to remain in the accumulator chamber 714 at an equalized pressure, thus ensuring that only fresh gas is injected during the next cycle. When the plunger 719 is returned to the beginning state, the plunger 719 may be located such that it blocks or is positioned just after the gas inlet port 712. This ensures that the source gas may not become contaminated by diffusion with the reservoir and discharge chamber gases.

When using the injection valve assembly 718, gas may be metered continuously at varying rates with fewer parts. In particular, the requirement for a separate check valve as well as a quantity of mechanical valves and the pressure gauge may be eliminated. Containing all of the gas handling components in a single chamber and plunger assembly also allows for simpler troubleshooting and replacement and longer time-between-failures. Although the plunger has movable parts and seals, the number of cycles can be minimized as compared to other embodiments, allowing for a longer component lifetime.

Figure 8:
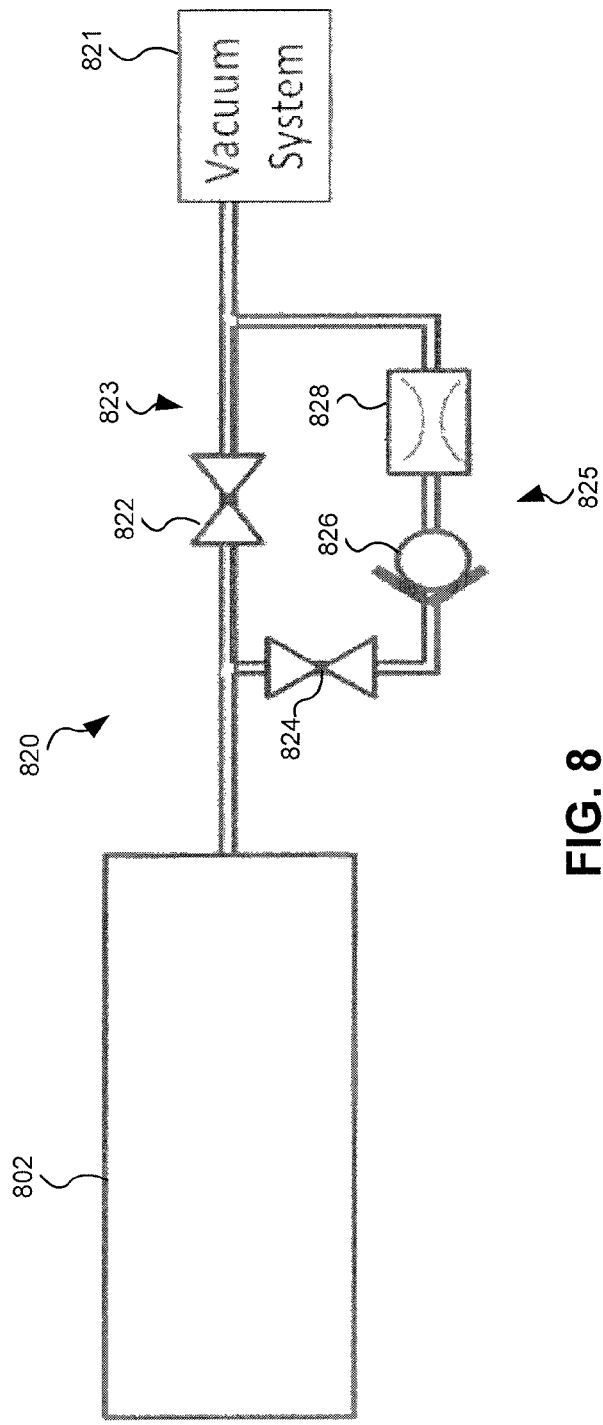
FIG. 8 is a schematic view of an exhaust system for use with a continuous mass flow gas replenishment system, consistent with embodiments of the present disclosure.

Referring to FIG. 8, an exhaust system 820 may be used to prevent back-flow and mixing of ambient air into a gas discharge chamber 802. This embodiment of the exhaust system 820 that can be combined with any of the embodiments of the continuous mass flow gas replenishment system described previously in reference to FIG. 1A through FIG. 7. The exhaust system 820 includes a vacuum system 821 (e.g., a vacuum pump) for creating a vacuum pressure to remove gases exhausted from the gas discharge chamber 802 through a main exhaust line 823 or through a bypass exhaust line 825. The exhaust system 820 includes control valves 822, 824 for controlling exhaust flow through either the main exhaust line 823 or through the bypass exhaust line 825. The bypass exhaust line 825 includes a check valve 826 and fixed bleed-down bypass orifice 828.

During normal operating conditions, the continuous mass flow gas replenishment results in pressurized exhaust gases flowing from the gas discharge chamber 802 through the main exhaust line 823 to the vacuum system 821. Whenever the pressure and/or exhaust flow rate of the gas discharge chamber 802 exceed the specifications of the vacuum system 821, the exhaust gases may be blocked by the main control valve 822 from directly flowing to the vacuum system 821 through the main exhaust line 823 and are instead directed via the bypass control valve 824 through the bypass exhaust line 825. The check-valve 826 and the orifice 828 limit the volume of flow to the vacuum system 821 such that the vacuum pump pressure and flow rate are within specification. Creating a high velocity flow through the orifice 824 reduces or prevents back-flow/mixing of exhausting gases into the gas discharge chamber 802.

Figure 9:
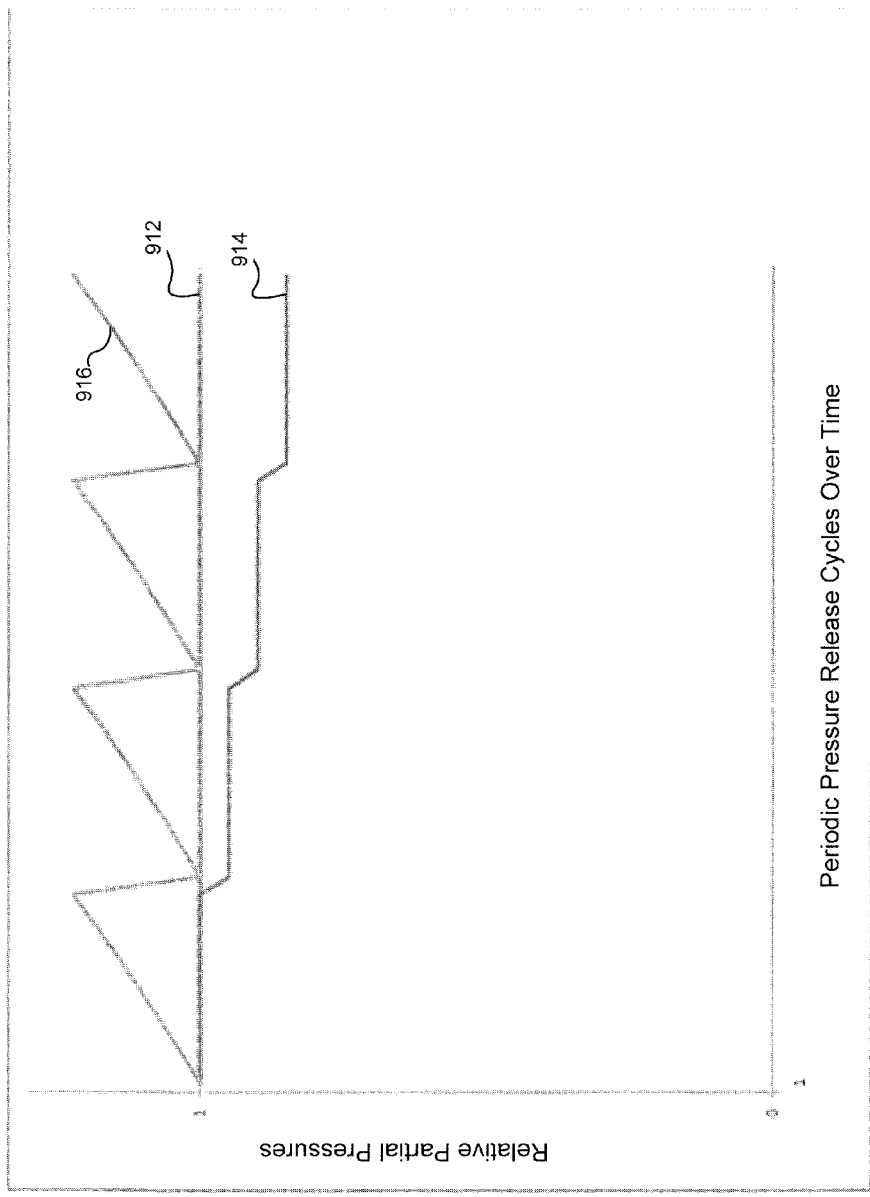
FIG. 9 illustrates the reduction in rare gas partial pressure as the vessel pressure is periodically relieved to mitigate the pressure increase due to halogen replenishment.

FIG. 9 shows a plot of halogen partial pressure 912, rare gas partial pressure 914, and vessel pressure 916. As illustrated, the addition of the halogen gas mixture to maintain a consistent halogen partial pressure 912 results in a requisite increase in vessel pressure 916. This may require that the vessel pressure be periodically (as shown), or continuously, relieved. This pressure relief results in the reduction of the rare gas partial pressure. When providing continuous mass flow gas replenishment, consistent with embodiments described herein, therefore, there may be continuous or periodic replenishment of the rare gas, as appropriate, to maintain a substantially continuous rare gas partial pressure.

Figure 10:
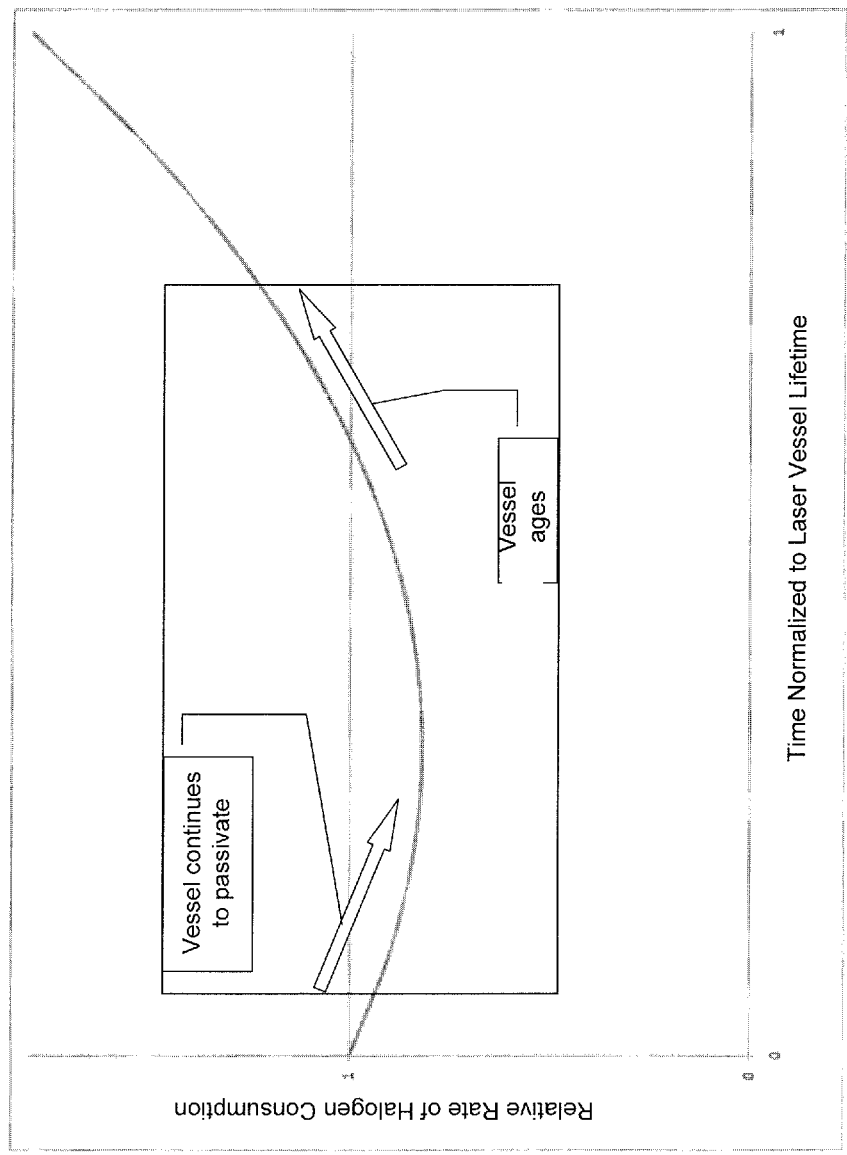
FIG. 10 illustrates how the rate of halogen depletion typically changes over the course of the lifetime of a laser vessel.

There are several methods for determining an optimum mass flow rate of the replenishment gas. One method is to identify a fixed mass flow rate that results in the maximum lifetime of the laser gas mix. The fixed mass flow rate may depend on the application and the duration of the laser run. Another method may adjust the fixed rate, for example, as the rate of halogen consumption changes. FIG. 10 illustrates how the rate of halogen consumption might vary over the course of the lifetime of a laser vessel without replenishment. There is typically a period at the beginning of the laser lifetime during which the laser continues to passivate and the rate of halogen consumption decreases. After some time, however, the laser vessel ceases to passivate any further but continuously collects various forms of contamination that increase the rate of halogen consumption.

Figure 11:
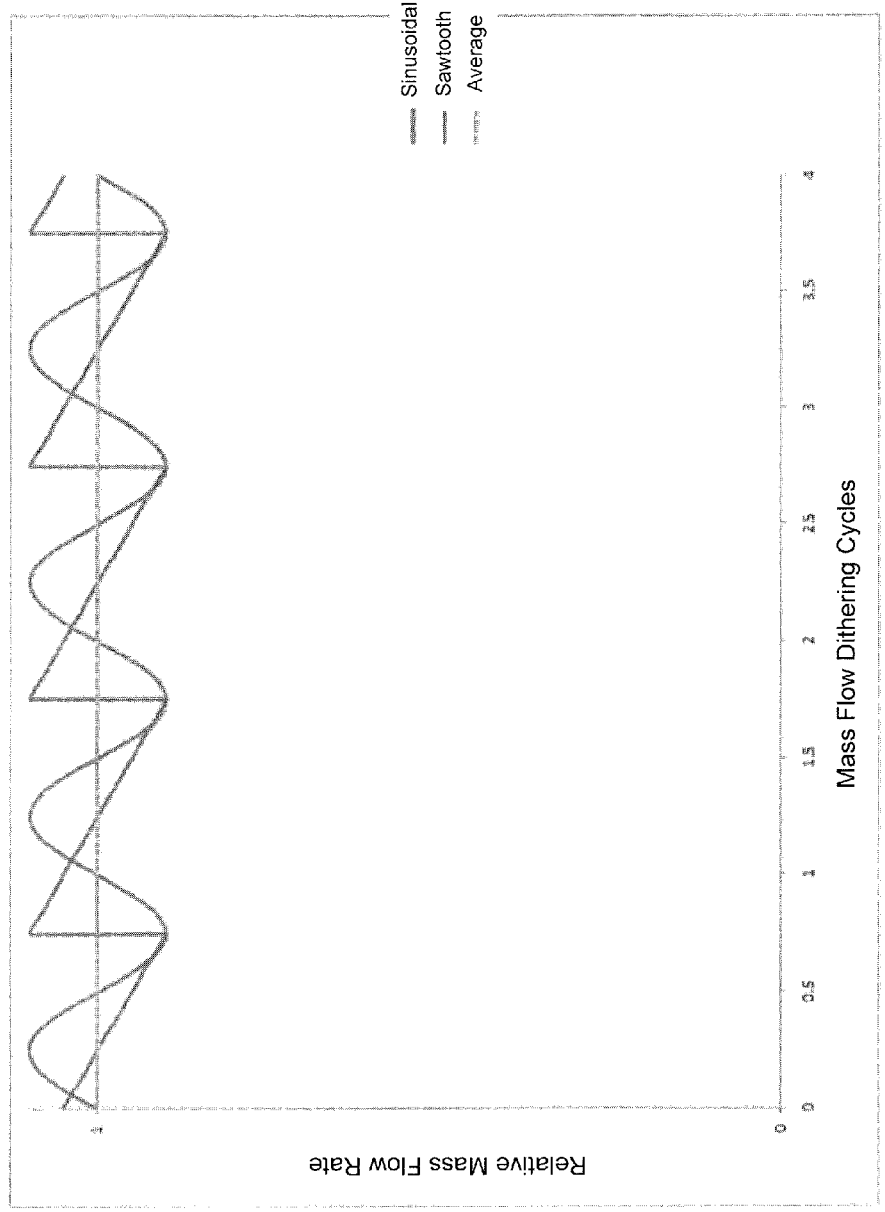
FIG. 11 illustrates a methodology for dithering the mass flow rate of one or more gases to ensure that the mass flow rates are maintained at an optimum value.

A more effective method for dynamically determining whether a parameter is at an optimum value is to dither the parameter around a current value by an amount small enough not to impact the process, but large enough to determine whether the optimum value is larger or smaller than the current value. FIG. 11 illustrates such a dithering technique as a method for dynamically determining an optimum mass flow rate consistent with embodiments of the present disclosure. The mass flow rates of one or more of the constituent gases may be varied in some manner about an average value. FIG. 11 illustrates sinusoidal and saw-tooth flow variation profiles for illustrative purposes, but other profiles may be used within the scope of the disclosure, including, but not limited to square and triangular profiles. The periodicities of the variations may be sufficiently long for the laser to be at, or near, equilibrium at any given time.

The method establishes an average mass flow rate, dithers the actual mass flow rate and monitors a parameter indicative of laser efficiency as the mass flow rate is periodically increased and decreased relative to the average mass flow rate. If the laser efficiency increases when the mass flow rate for a particular constituent gas mix is greater than average, then the average mass flow rate for that gas is increased proportionately. Conversely, if the laser efficiency increases when the mass flow rate is less than average, then the average mass flow rate is decreased proportionately. The mass flow rates may be changed, for example, by changing the pressure across a restrictive orifice coupled to the gas discharge chamber, by adjusting a geometry of the restrictive orifice, and/or by adjusting a control valve, as described above.

Accordingly, a continuous mass flow gas replenishment system and method, consistent with embodiments described herein, provides a stable, reliable, and economical method of continuously replenishing used gases during a laser run or between laser gas refills, while mitigating back-mixing of the laser vessel or exhaust gases into the gas supply manifold system.

Consistent with an embodiment, a continuous mass flow gas replenishment system is provided for a gas discharge laser or amplifier. The gas discharge laser or amplifier includes a discharge chamber for containing a gas or a mixture of gases and a plurality of electrodes located in a discharge region of the discharge chamber. The continuous mass flow gas replenishment system includes at least one gas source, at least one accumulator gas chamber configured to receive the gas from the gas source, and at least one restrictive orifice between the at least one accumulator gas chamber and the gas discharge chamber and configured to provide a mass flow rate into the gas discharge chamber as a function of a pressure drop across the restrictive orifice.

Consistent with another embodiment, a gas discharge lasing device includes a gas discharge chamber containing a gas or a mixture of gases and a plurality of electrodes locating in a discharge region of the discharge chamber. The gas discharge lasing device further includes at least one gas source, at least one accumulator gas chamber configured to receive the gas from the gas source, and at least one restrictive orifice between the at least one accumulator gas chamber and the gas discharge chamber and configured to provide a mass flow rate into the gas discharge chamber as a function of a pressure drop across the restrictive orifice.

Consistent with a further embodiment, a method is provided for gas replenishment of one or more gases in a gas laser or amplifier. The method includes: allowing at least one of the gases to flow continuously from a gas accumulator chamber into a gas discharge chamber; regulating a mass flow rate of the at least one of the gases using a geometry of a restrictive orifice and a pressure differential between the gas accumulator chamber and the discharge chamber; and relieving pressure above a predefined value via a check valve out of the gas discharge chamber to an exhaust system.

Consistent with yet another embodiment, method is provided for controlling a laser discharge by maintaining constituent operating gases at optimum partial pressures. The method includes: establishing an average mass flow rate of at least one of the constituent gases into a gas discharge chamber; dithering an actual mass flow rate of the at least one of the constituent gases about the average mass flow rate over timescales of sufficient duration for the laser to be substantially at equilibrium; monitoring changes in a parameter indicative of laser efficiency at the actual mass flow rates higher and lower than the average mass flow rate; and modifying the average mass flow rate for the at least one of the constituent gases to a higher or lower value, proportional to a corresponding change in the parameter indicative of laser efficiency at a higher or lower flow rate, respectively.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. A continuous mass flow gas replenishment system for a gas discharge laser or amplifier, the gas discharge laser or amplifier including a gas discharge chamber for containing a gas or a mixture of gases and a plurality of electrodes located in a discharge region of the discharge chamber, the system comprising:
   at least one gas source;
   at least one accumulator gas chamber configured to receive the gas from the gas source; and
   at least one restrictive orifice between the at least one accumulator gas chamber and the gas discharge chamber and configured to provide a mass flow rate into the gas discharge chamber as a function of a pressure drop across the restrictive orifice.

2. The system of claim 1, wherein the restrictive orifice is located in a metering device.

3. The system of claim 2, wherein the metering device is selected from a group consisting of an orifice plate, a Venturi tube, and a flow nozzle.

4. The system of claim 2, wherein the metering device operates on the Bernoulli principle.

5. The system of claim 1, further comprising at least one check valve located between the at least one gas source and the accumulator gas chamber.

6. The system of claim 1, further comprising:
   at least one control valve located between the at least one gas source and the gas accumulator chamber; and
   a control system configured to actuate the at least one control valve in response to at least one operating parameter to control the source gas provided to the accumulator gas chamber.

7. The system of claim 6, further comprising:
   a pressure regulator located between the at least one gas source and the accumulator gas chamber for modulating an input pressure to the accumulator gas chamber to adjust a pressure drop across the restrictive orifice.

8. The system of claim 6, wherein the control system is configured to actuate the control valve in response to a monitored pressure.

9. The system of claim 6, wherein the restrictive orifice includes a variable orifice.

10. The system of claim 1, further comprising:
    a pressure regulator located between the at least one gas source and the accumulator gas chamber for modulating an input pressure to the accumulator gas chamber to adjust a pressure drop across the restrictive orifice.

11. The system of claim 1, further comprising an injection valve assembly coupled to the accumulator gas chamber for pressurizing the accumulator gas chamber, the injection valve assembly including a plunger movable within the accumulator gas chamber and sealed relative to the accumulator gas chamber such that the plunger is capable of pressurizing the accumulator gas chamber, the plunger including a one-way mechanical valve to allow fresh gas to pass into the accumulator gas chamber.

12. The system of claim 1, further comprising an exhaust system comprising a vacuum system and a main exhaust line and a bypass exhaust line coupled between the gas discharge chamber and the vacuum system, the bypass exhaust line including a check valve and fixed bleed-down bypass orifice.

13. A gas discharge lasing device comprising:
    a gas discharge chamber containing a gas or a mixture of gases;
    a plurality of electrodes locating in a discharge region of the discharge chamber;
    at least one gas source;
    at least one accumulator gas chamber configured to receive the gas from the gas source; and
    at least one restrictive orifice between the at least one accumulator gas chamber and the gas discharge chamber and configured to provide a mass flow rate into the gas discharge chamber as a function of a pressure drop across the restrictive orifice.

14. The gas discharge lasing device of claim 13 further comprising at least one check valve located between the at least one gas source and the accumulator gas chamber.

15. A method of gas replenishment of one or more gases in a gas laser or amplifier, the method comprising:
    allowing at least one of the gases to flow continuously from a gas accumulator chamber into a gas discharge chamber;
    regulating a mass flow rate of the at least one of the gases using a geometry of a restrictive orifice and a pressure differential between the gas accumulator chamber and the discharge chamber; and
    relieving pressure above a predefined value via a check valve out of the gas discharge chamber to an exhaust system.

16. The method of claim 15 further comprising isolating the gas discharge chamber gases from the source gases using at least one valve.

17. The method of claim 16 further comprising varying a frequency of actuation of the at least one valve in response to one or more operating parameters in a laser duty cycle.

18. The method of claim 16 further comprising closing the at least one valve to prevent source gas from entering the discharge chamber through the accumulator chamber and restrictive orifice during cooling of the discharge chamber.

19. A method of controlling a laser discharge by maintaining constituent operating gases at optimum partial pressures, the method comprising:
    establishing an average mass flow rate of at least one of the constituent gases into a gas discharge chamber;
    dithering an actual mass flow rate of the at least one of the constituent gases about the average mass flow rate over timescales of sufficient duration for the laser to be substantially at equilibrium;
    monitoring changes in a parameter indicative of laser efficiency at the actual mass flow rates higher and lower than the average mass flow rate; and
    modifying the average mass flow rate for the at least one of the constituent gases to a higher or lower value, proportional to a corresponding change in the parameter indicative of laser efficiency at a higher or lower flow rate, respectively.

20. The method of claim 19 wherein dithering the actual mass flow rate includes changing a pressure differential across a restrictive orifice coupled to the gas discharge chamber.

* * * * *